Jan. 2, 1962 T. M. N. WOOD 3,015,354
FLEXIBLE TUBE FORMING MACHINE
Filed Dec. 11, 1956 2 Sheets-Sheet 1

INVENTOR.
THOMAS M. N. WOOD
BY
ATTORNEYS

Jan. 2, 1962  T. M. N. WOOD  3,015,354
FLEXIBLE TUBE FORMING MACHINE
Filed Dec. 11, 1956  2 Sheets-Sheet 2
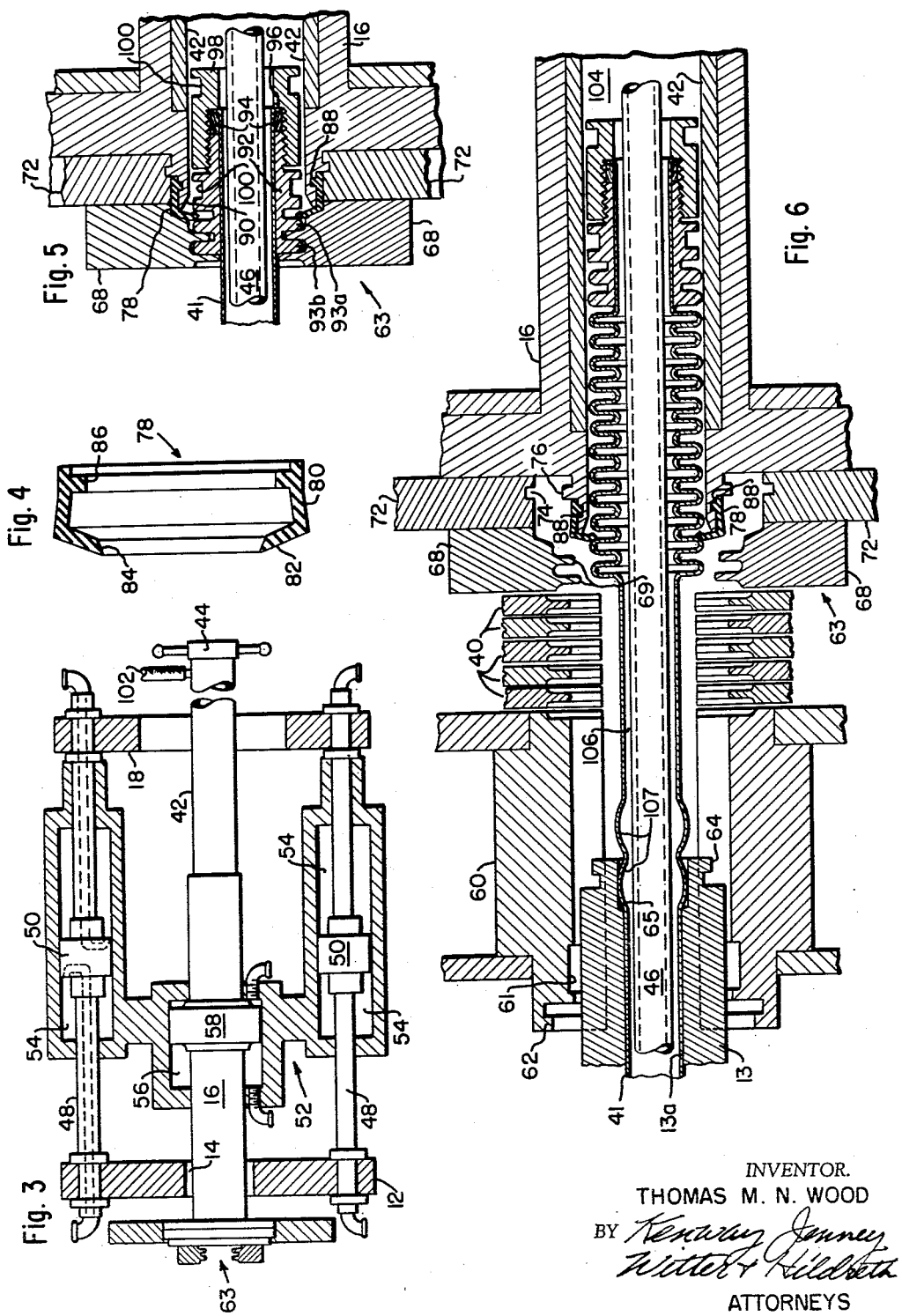
INVENTOR.
THOMAS M. N. WOOD
BY
ATTORNEYS ＃ 3,015,354
FLEXIBLE TUBE FORMING MACHINE
Thomas M. N. Wood, Foxboro, Mass., assignor to Standard-Thomson Corporation, Boston, Mass., a corporation of Delaware
Filed Dec. 11, 1956, Ser. No. 627,683
10 Claims. (Cl. 153—73)

The present invention relates generally to a machine for forming bellows-like convolutions in metal tubing, and more particularly to improvements in a machine for forming relatively long, continuous flexible tubes, especially but not exclusively for use as connecting hose for certain fluids, and the like.

In my copending application Serial No. 347,093, now Patent No. 2,796,109, filed April 6, 1953, I disclose in detail a complete machine and its control system, which is adapted to produce a length of flexible tubing from a straight, rigid length by a multiple-cycle hydraulic process. In each cycle a limited number of flexible convolutions are formed, and the tubing is then moved into position for subsequently forming a like number of convolutions adjacent to those previously formed, the cycle being repeated as many times as is necessary to produce the desired length.

A characteristic of the machine described in the above application is that a pair of internal hydraulic pressure seals are provided for the tubing, these seals being arranged to close the space within the section where the convolutions are formed. Thus the only section of the workpiece that is subjected to hydraulic pressure is that between the seals. About this section are disposed a plurality of spaced, annular, retractable forming plates, the plates restraining spaced annular portions of the workpiece during the application of hydraulic pressure to permit the tubing to expand at regular intervals and to form the bellows-like convolutions. With this arrangement, it is necessary to provide one internal seal for the straight, unformed section of tubing, and a second internal seal to close the space adjacent the previously formed convolutions, the seals being longitudinally displaceable in relation to each other during the forming process and in relation to the workpiece in the time intervals between the forming of successive groups of convolutions.

Experience with internal seals of the type described above indicates that in some instances they tend to become stuck inside the tubing, thereby tending to obstruct the proper feeding of the workpiece in relation to the seals. This is particularly true of the seal operative against the formed convolutions in that the application of hydraulic pressure to the space between the seals tends to force the latter seal to expand to a diameter exceeding the inner diameter of the folds in the convolutions, and hence to enter the included annular spaces in the convolutions.

A principal object of this invention is to provide an improved forming machine of the general type disclosed in my pending application, wherein the problems incident to the use of internal seals are substantially eliminated, thereby permitting the manufacture of relatively long flexible tubing of very small diameter, which would be difficult if not impossible in a machine employing internal seals.

Another object is to provide an improved form of seal which is adapted to cooperate with the external wall of a formed section of convoluted tubing to provide an effective pressure seal upon the application of hydraulic pressure thereto.

With the above and other objects in view, as will be apparent from the following description, the features of the invention comprise an improved forming machine including external sealing means, whereby the pressurized area within and surrounding the tubing is extended to include portions other than that within which the convolutions are being formed in any given cycle.

Another feature resides in improvements in the sealing devices, including an external seal adapted to be moved longitudinally in relation to the formed section of tubing during its movement between successive forming operations, thereby permitting the pressure closure to be formed against selected convolutions at predetermined spaced intervals.

Other features reside in certain details of construction, arrangements of the parts and modes of operation as will become clear from the following description of a preferred embodiment, having reference to the appended drawings illustrating the same.

In the drawings:

FIG. 3 is a side elevation in section illustrating the "driving cylinder" section of the machine;

FIG. 4 is a side elevation in section of the preferred form of external pressure seal;

FIG. 5 is a side elevation in section showing details of the end fitting for the workpiece; and FIG. 6 is a view similar to FIGS. 1 and 2 illustrating the positions of the parts in the third, or "feeding," portion of the forming cycle.

The structure and arrangement of the parts of the improved forming machine are in many respects similar to those of my above-mentioned copending application, to which reference is hereinafter made for further description. However, the machine there described is modified as disclosed herein to provide a structure that relies on external seals for the tubing, rather than internal seals.

Figure 1:
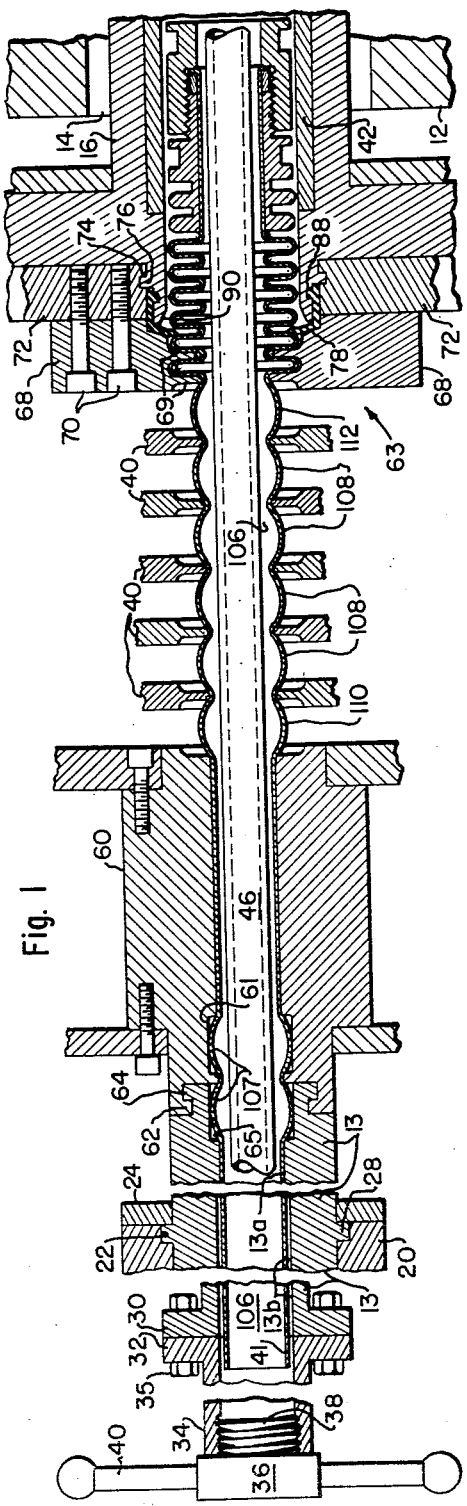
FIG. 1 is a partial side elevation in section of the machine, illustrating the positions of the parts in the initial, or "pre-forming," portion of a forming cycle.

Referring to FIG. 1, the machine is provided with a rigid, fixed frame including a vertical supporting wall 12 and an elongated tube 13. The tube 13 has a bore 13a of diameter sufficient barely to clear an unformed section of the workpiece and a bore 13b of somewhat greater diameter. The wall 12 is provided with a circular opening 14 through which is received a longitudinally movable cylinder 16, hereinafter more fully described. The portion of the machine between the wall 12 and the nearer end of the tube 13 as viewed in FIG. 1 is referred to as the "book" section. The wall 12 is also visible in FIG. 3, the latter figure also showing a vertical, fixed supporting wall 18 forming a part of the frame of the machine. The portion of the machine between the walls 12 and 18 is referred to as the "driving cylinder" section.

Referring again to FIG. 1, the frame of the machine includes a support 20 with a cylindrical bore having an annular recess 22 in the opening of the bore. A plate 24 is adapted to be secured to the end face of the support 20 to hold the tube 13 securely in place by means of an annular collar 28 on the tube. The tube 13 has an end flange 30 to align with a flange 32 on a cylindrical end piece 34, the piece 34 having an internal thread. The tube 13 and piece 34 are bolted together by bolts 35 to form a pressure seal. A breech cap 36 at the receiving or "front" end of the machine, having a threaded nipple 38 and turning handles 40, is adapted to be threaded into the piece 34 and to form a hydraulic pressure seal therewith.

An unformed workpiece 41 of cylindrical metal tubing is inserted into the tube 13 from the left end as viewed in FIG. 1. It will be understood that the tube 13 is of some considerable length, whereby the workpiece may be inserted to a position with its right-hand extremity approximately reaching the wall 12 when its left-hand extremity is sufficiently within the end piece 34 to permit the breech cap 36 to be turned tightly onto it.

As shown in FIG. 1, the machine is provided with five forming plates 40 which are constructed and operated in the manner disclosed in detail in the above-mentioned application. It will be understood that a greater or lesser number of forming plates may be employed. Six convolutions are completed in each forming cycle of the machine as illustrated, starting from the right-hand end of the workpiece, and the workpiece is moved progressively in steps to the right at the end of each forming cycle. The complete convolutions are received into an elongated, longitudinally reciprocated tube 42 secured to and within an annular bore in the cylinder 16 (FIG. 3). The delivery (right-hand) end of the tube 42 is closed by an end cap 44 (FIG. 2) similar in construction to the cap 36. However, the cap 44 is also secured to, and supports concentrically, one end of a guide tube 46 that extends through the "driving cylinder" and "book" sections of the machine and with substantial clearance into the tube 13. The workpiece 41 is received loosely over the guide tube 46, which furnishes support at all times to the portion of the piece 41 within the "book" section.

The driving cylinder section illustrated in FIG. 3 is substantially the same as that disclosed in detail in the above-mentioned application, but will be briefly described herein. Between the stationary walls 12 and 18 are supported a pair of fixed rods 48 having integral piston-like portions 50 securely pinned to the rods. A carriage 52 is slidably received over the rods 48, and includes a pair of forming cylinders 54 and a pick-up cylinder 56. The cylinder 16 is provided with a piston-like portion 58 received within the cylinder 56. It will be seen that the application of hydraulic pressure to the cylinders 54 and 56 by suitable connections permits movements of the cylinder 16 and the tube 42 to predetermined longitudinal positions as required by the successive steps in the forming cycle. While the details of the pressure connections and the means for determining these positions are not shown in the drawing, they are substantially identical with the corresponding connections and means described in said application, as will be evident from the more detailed description of the forming cycle hereinafter set forth.

From the foregoing, it will be appreciated that the elongated tube 13 remains stationary while the elongated tube 42 reciprocates longitudinally, progressively receiving the convoluted sections of tubing as they emerge from the "book" section adjacent the forming plates 40 and move through and beyond the "forming cylinder" section toward the end cap 44. When the flexible tubing is completed, it is withdrawn from the right-hand end of the machine as viewed in FIG. 2 by unscrewing the cap 44 and withdrawing it with the guide tube 46 over which the formed convolutions are then received.

*"Book" section*

As stated above, the "book" section of the machine is constructed and operated substantially as described in the above-mentioned application. However, the structure is somewhat modified in the manner hereinafter described.

The parts of the "book" section illustrated in the appended drawings are those that are directly operative upon the workpiece 41 in the forming operation. These include the forming plates 40, an end forming plate 60 which except for its shape is constructed and operated in the same manner as the forming plates 40, and a chuck assembly indicated generally at 63. Spacer plates and stepped plates for guiding and restraining the forming plates are not shown, but are preferably used with the forming plates 40 as described in said application.

Figure 2:
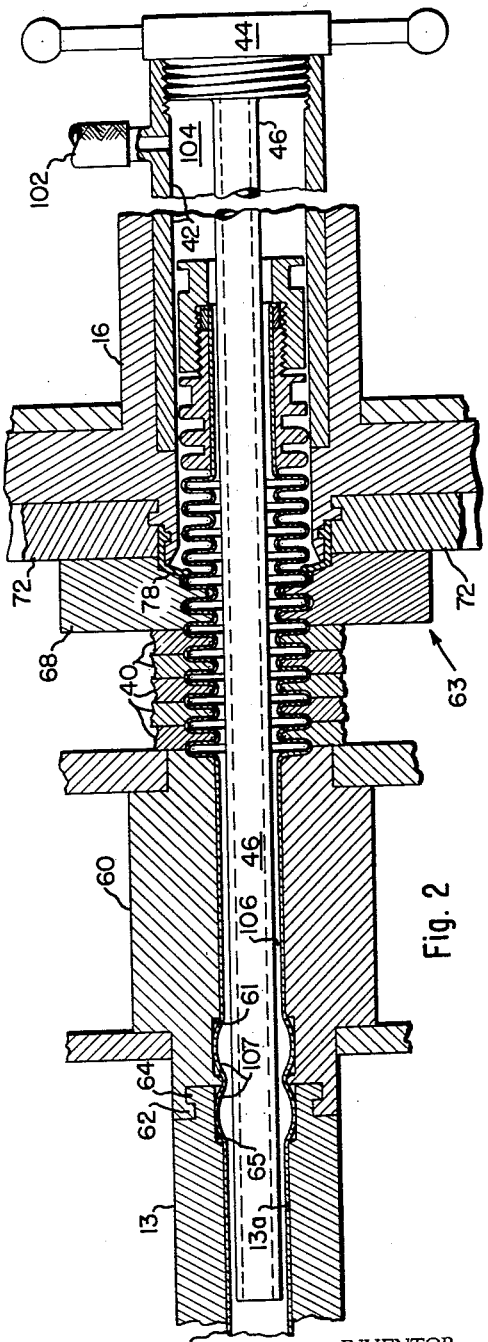
FIG. 2 is a side elevation in section showing portions of the apparatus of FIG. 1 in a second, or "completion," portion of the forming cycle.

As is also described in said application, the forming plates 40 and 60 are each constructed of a pair of members each having a semi-circular, convolution-shaped aperture, each pair of members being adapted to be closed together about the workpiece 41 so as to provide continuous annular restraint at regularly spaced intervals. The forming plates are also supported with freedom for mutually-independent longitudinal translation in relation to the axis of the workpiece. To this end, they are preferably slidably supported upon longitudinally-oriented rods as shown and described in said application, the rods being carried by hinged end members whereby the forming plates may be closed about the workpiece as shown in FIGS. 1 and 2, or opened outwardly therefrom sufficiently to clear the formed convolutions as illustrated in FIG. 6.

In the present embodiment, the end forming plate 60 is of a modified form having an annular channel 61 and an annular locking flange 62 adapted to engage with a matching annular flange 64 on the tube 13. The tube 13 also has an annular channel 65 identical with the channel 61. When the forming plates are closed, the locking flanges 62 and 64 are engaged as illustrated in FIGS. 1 and 2, and when the forming plates are opened the flanges are disengaged sufficiently to permit the plate 60 to pass over the outside of the tube 13 (FIG. 6).

The chuck 63 preferably comprises three meshing, wedge-shaped segments 68 each having a pair of flanges 69 (FIG. 1) generally conforming with one segment of each of a pair of completed convolutions in the workpiece. Each segment 68 is secured by means of a pair of bolts 70 to corresponding radially movable plate 72 having a groove 74 to receive a rib 76 on the cylinder 16. Preferably, the three plates 72 are each slidable radially in relation to the workpiece by means of the mechanism fully described in said application. The chuck is shown in its closed position in FIGS. 1 and 2, and in its open position in FIG. 6. It will be understood that in accordance with the above-mentioned application, the chuck may be opened or closed independently of the forming plates 40 and 60.

According to this invention, the structure of the chuck is modified by provision to accommodate an improved external seal member 78 secured to the end of the cylinder 16. An enlarged diametral sectional elevation of the member 78 is shown in FIG. 4. It will be understood that all diametral sections of the member are identical with that illustrated. The member consists of a generally cylindrical portion 80, a flanged end portion 82 having a tapered edge 84, and an inner annular rib 86 adapted to fit within an annular recess 88 in the cylinder 16 adjacent the rib 76 (FIG. 6). Preferably, the chuck is adapted to be opened sufficiently to permit the operator to reach by hand within the flanges 69 to remove or replace the member 78 in case it becomes worn. The member 78 is preferably fabricated of rubber or other suitable rubber-like elastomeric material. When the chuck is closed the member 78 is firmly held between the cylinder 16 and the chuck members 68 and 72. The cylinder 16 is also provided with a tapered inner end surface 90 (FIGS. 1 and 5) to provide an annular space outside the major diameter of the completed convolutions. When the chuck is open as illustrated in FIG. 6, the cylinder 16 may be moved leftwardly while the workpiece 41 is held stationary, the member 78 being deflected rearwardly into this annular space and riding over the convolutions. When the leftward movement of the cylinder 16 is stopped, the flange 82 of the member 78 snaps back toward its rest position as illustrated in FIG. 4, enters the space between a pair of the convolutions, and bears against one of them to form a hydraulic pressure seal. As will be appreciated from the description to follow, the effectiveness of this seal is enhanced by the application of hydraulic pressure to the space within the cylinder 16, since this pressure is operative to force the flange 82 more firmly against the convolution.

*End fitting assembly*

After insertion of an unformed workpiece into the machine with the end protruding into the book section, the book being open, it is assembled with an easily removable end fitting, shown in detail in FIG. 5. In this assembly, a member 92 having convolution-shaped flanges 93a and 93b and a threaded nipple portion is first received over the end of the workpiece. With the tubing extending a short distance beyond the nipple, a pair of identical semi-cylindrical filler pieces 94 are received over the tubing, and the tubing is flared outwardly over the ends of the pieces 94 as indicated at 96. Finally, an end piece 98 having internal threads is received over the pieces 94 and threaded onto the member 92. Wrench flats 100 on the pieces 92 and 98 are provided to facilitate tightening the pieces so as to compress the flare 96 firmly against the filler pieces 94.

The above-described fitting performs a number of useful functions and provides certain advantages. First, it provides the workpiece with flanges adapted to cooperate with the chuck segments 68 in the initial forming operation. Thus the member 92 and the chuck cooperate to restrain the workpiece during the formation of the initial set of convolutions. Thereafter, the first feeding operation brings the newly formed convolutions into alignment with the chuck and the end fitting on the workpiece slides into the tube 42. Second, in the initial forming operation, the flange 93a cooperates with the seal member 78 to provide a hydraulic pressure seal. Third, the portions of the end fitting within the cylinder 16 or the tube 42 provide additional support for the leading end of the workpiece as it is moved progressively along the guide tube 46. Fourth, when the workpiece is removed from the machine, the end fitting is adapted to be easily removed by first unscrewing the end piece 98, then removing the filler pieces 94, and finally cutting the tubing to remove the flange 96 so as to permit the member 92 to be withdrawn over the cut end. This leaves the workpiece in an accurately dimensioned, finished condition for subsequent assembly operations as required.

FIG. 5 illustrates the position of the workpiece at the beginning of the first forming operation after the chuck 63 has been closed upon the end fitting prior to the application of forming pressure. As shown, the seal 78 bears resiliently upon the flange 93a in substantially the same manner as it bears against the convolutions in the workpiece 41 in the subsequent positions indicated in FIGS. 1, 2 and 6.

*Operation*

As indicated above, the machine operates in successive forming cycles, each cycle consisting of the steps necessary for the completion of a set of six convolutions. Each cycle is divided into a "preforming" portion, a "completion" portion and a "feeding" portion.

An understanding of the operation may be gained from considering the initial positions of the parts when the chuck 63 is closed upon the member 92 secured to an unformed workpiece 41 as illustrated in FIG. 5 and described under the immediately preceding heading. Before the application of forming pressure the "book" is closed, thereby bringing the forming plates closely about the workpiece and locking the end forming plate 60 with the end of the fixed tube 13, these parts assuming the positions illustrated in FIG. 1.

Next, hydraulic pressure is supplied through a connection 102 (FIG. 2) to the space 104 within the tube 42. Because of the loose fit between the tube 46 and the workpiece, the water fills the interior of the workpiece and the space 106 within the tube 13. The pressure is also applied to the seal 78 to cause it to seat firmly against the flange 93a (FIG. 5), providing a tight seal. At the opposite end of the machine, an external seal for the workpiece is provided by expansion of the latter against the closely-fitting portion 13a of the tube 13. That is, while the portion 13b of the tube 13 clears the workpiece 41 by an appreciable amount and therefore allows the water to pass around the end of the latter, the clearance between the workpiece and the portion 13a is relatively small and the workpiece expands upon the application of hydraulic pressure sufficiently to seal itself against the surface of the portion 13a over a sufficient area of surface to prevent the substantial leakage of water into the region of the channels 61 and 65. The workpiece therefore expands into these channels and between each pair of forming plates and assumes substantially the shape illustrated in FIG. 1. As will be clear from the discussion to follow, the resulting partial convolutions 107 are used to restrain the workpiece in an accurate position during the completion and feeding portions of the forming cycle. The concurrent formation of intermediate partial convolutions 108 and end partial convolutions 110 and 112 between the forming plates occurs in the same manner as that described in the above-mentioned application.

The parts are then in the positions indicated in FIG. 1, except that the seal 78 is engaged with the member 92 as illustrated in FIG. 5, rather than with the workpiece as indicated in FIG. 1.

The "completion" portion of the forming cycle is initiated by automatic means or manual controls which apply pressure to the forming cylinders 54 to drive the cylinder 16 leftwardly as viewed in FIGS. 1, 2 and 3. During this movement the hydraulic forming pressure within the tubes 13 and 42 and the workpiece is maintained, as described in said application. The workpiece 41 is restrained by the end forming plate 60 and the sleeve 13 through engagement of the channels 61 and 65 with the partial convolutions 107, and also through engagement of the partial convolution 110 with the plate 60. The cylinder 16 is moved leftwardly from an initial position as shown in FIG. 1 to a position as shown in FIG. 2. Since the cylinder 16 bears positively upon the chuck, the chuck moves with the cylinder, bearing against the end convolution 112. The convolutions are therefore compressed and completed between the fixed end plate 60 and the chuck, and the forming plates 40 are brought closely together as illustrated in FIG. 2.

When the cylinder 16, the chuck 62 and the forming plates 40 reach the positions illustrated in FIG. 2, the applied hydraulic pressure is removed, and immediately thereafter the cylinder 16 is moved to the right as described in the above-mentioned application a slight distance sufficient to relieve the "spring" in the convolutions and thereby to facilitate withdrawal of the forming plates 40 from the convolutions. The resultant spacing between the forming plates following this slight movement is substantially as illustrated in FIG. 6.

Following the removal of the forming pressure and the slight opening of the forming plates as described above, the "book" is opened to the position indicated in FIG. 6, and the chuck is also opened. The parts are then in position for initiation of the "feeding" portion of the cycle.

The "feeding" portion of the cycle commences with application of pressure to the pickup cylinder 56 to move the cylinder 16 an additional distance to the left, carrying the end forming plate 60 over the stationary tube 13 to an extreme left position as indicated in FIG. 6. The workpiece 41 is held stationary in this movement by engagement of the channel 65 with one of the partial convolutions 107, and the seal 78 is deflected away from the flange 93a and is caused to ride resiliently over the outside of the flange 93b and all except two of the newly completed convolutions in the workpiece. When this movement is completed with the parts in the positions illustrated in FIG. 6, the seal 78 snaps against the next-to-last newly formed convolution, as shown.

The chuck 63 is now closed over the two end convolutions, following which the cylinder 16 is withdrawn to its extreme right hand position as illustrated in FIG. 1. At this time, the "book" of forming plates is still open and the forming plates including the end plate 60 become longitudinally aligned with the workpiece as indicated by FIG. 1. Preferably, the mechanism for moving the forming plates 40 and 60 is identical with that described in said application, and therefore is not further described herein. Finally, the "book" is closed to cause the forming plates 40 and 60 to engage with a new section of the workpiece, as illustrated in FIG. 1.

The center-line distances between the partial convolutions 107 and 110 are integral multiples of the longitudinal center-line distance between each pair of the partially formed convolutions 108, 110 and 112. Thus, in the illustrated machine, upon completion of the "feeding" portion of the cycle, the partial convolutions 107 reach positions properly aligned between the forming plates in the positions formerly occupied by the end convolution 110 and the adjacent intermediate convolution 108. But it is obvious that the partial convolution 107 may be caused to move into alignment with other forming plates, if desired by changing the dimensions of the end plate 60. This insures in any case that the forming plates can be properly closed and that after the plates are closed the subsequent application of hydraulic pressure to the workpiece will not cause it to be subjected to substantial distortion a second time in the region of the partial convolutions 107, which would tend to weaken the tubing. Thus the finished tubing bears no visible indication of the locations of the partial convolutions 107, and the successive sets of convolutions and the convolutions within each set are identical and bear no marks of discontinuity.

However, it will be apparent to one skilled in the art that successive sets of convolutions may be spaced by predetermined straight lengths of tubing in the disclosed machine by suitable adjustment of the distance through which the workpiece is moved during the "feeding" portion of the forming cycle. In that case, the forming plate 40 adjacent the chuck 63 is preferably replaced by a modified forming plate having additional thickness, including a portion closely fitting the workpiece and separating the other forming plates from the chuck. The thickness of this portion determines the length of straight tubing between adjacent sets of convolutions.

The operation of the machine as hereinabove described may be carried on with a minimum of attention, and flexible tubing of considerable length and small diameter can be formed rapidly, with straight lengths of tubing being inserted at one end, completed and withdrawn from the other ends, thus facilitating the flow of materials.

While in the machine, the workpiece is subjected to periodic cycles of forming pressure throughout its entire inner length, and throughout its outer length except in the region between the seal 73 and the seal formed by its outer, expanded surface opposite the bore 13a in the tube 13. Thus no internal seals are used.

It will be understood that while the invention has been described with reference to a preferred embodiment, it is by no means restricted to the latter, but includes such modifications thereof, including variations in the structure, arrangement and operation as would occur to one skilled in the art upon a study of the foregoing specification and the appended drawings, subject only to those limitations appearing in the appended claims.

Having thus described the invention, I claim:

1. In apparatus for forming flexible tubing, means to restrain and externally seal a workpiece of convoluted tubing including, in combination, a tubular member to receive the workpiece, an elastomeric seal member secured about the end of the tubular member and provided with a flange tending to extend between the convolutions of the workpiece, and a chuck member having flanges conforming with the convolutions, mounted upon the end of said tubular member, and adapted to be closed about the convolutions and over said seal or opened to permit longitudinal movement of the convolutions, the flange of said seal having clearance to withdraw from between the convolutions during said movement.

2. Apparatus for forming flexible convoluted tubing having, in combination, a pair of tubes arranged in spaced coaxial relationship to receive a workpiece, said workpiece including a length of tubing and having a portion conforming externally to a part of at least one completed convolution, the workpiece having an open end within each of said tubes, each tube having means to form an annular seal with the outer wall of the workpiece, spaced forming plates adapted for closing around the workpiece in the space between the tubes, means for applying hydraulic pressure to the interior of said tubes, said tubes having clearances about the workpiece to permit said pressure to reach the inner and outer surfaces of the workpiece except for the outer surface between the seals, whereby the workpiece is bulged outwardly against the plates to form partial convolutions, means for completing said convolutions by moving the tubes together while said pressure is maintained, means for removing the forming plates from the convolutions, and means engageable with said portion and adapted to advance the workpiece between said tubes and to engage at least one of the completed convolutions.

3. Apparatus for forming a flexible member having, in combination, a pair of tubes arranged in spaced coaxial relationship to receive a workpiece of tubing, the workpiece having an open end within each of said tubes, one of said tubes having means to form an annular seal with the outer wall of the workpiece, the other of said tubes having a first portion of its wall fitted closely to the workpiece and a second portion having an annular channel adjacent the workpiece, spaced forming plates adapted for closing around the workpiece in the space between the tubes, means for applying hydraulic pressure to the interior of said tubes, said tubes having clearances about the workpiece to permit said pressure to reach the inner and outer surfaces of the workpiece except for the outer surface between said seal and said first portion, whereby the workpiece is bulged outwardly against the plates to form partial convolutions, said workpiece also being deformed into said channel and expanded against said first portion to form a seal, and means for completing said convolutions by moving the tubes together while said pressure is maintained.

4. Apparatus for forming flexible convoluted tubing having, in combination, a pair of tubes arranged in spaced coaxial relationship to receive a workpiece, said workpiece including a length of tubing and having a portion conforming externally to a part of at least one completed convolution, the workpiece having an open end within each of said tubes, one of said tubes having means to form an annular seal with the outer wall of the workpiece, the other of said tubes having a first portion of its wall fitted closely to the workpiece and a second portion having an annular channel adjacent the workpiece, spaced forming plates adapted for closing around the workpiece in the space between the tubes, means for applying hydraulic pressure to the interior of said tubes, said tubes having clearances about the workpiece to permit said pressure to reach the inner and outer surfaces of the workpiece except for the outer surface between said seal and said first portion, whereby the workpiece is bulged outwardly against the plates to form partial convolutions, said workpiece also being deformed into said channel and expanded against said first portion to form a seal, means for completing said convolutions by moving the tubes together while said pressure is maintained, means for removing the forming plates from the convolutions, and means engageable with said portion of the workpiece and adapted to advance it between the tubes and to engage at least one of the completed convolutions, the advancement being completed when the portion deformed in said channel is in register between a pair of forming plates.

5. Apparatus for forming a flexible member having, in combination, a tube to receive a portion of a workpiece of tubing, the workpiece having an open end within said tube, the tube having means to form an annular seal with the outer wall of the workpiece, spaced forming plates adapted for closing around a portion of the workpiece outside the tube and adjacent an end thereof, means for applying hydraulic pressure to the interior of the tube, the tube having clearance about the workpiece to permit said pressure to reach the inner and outer surfaces of the workpiece except for the outer surface between the seal and said forming plates, whereby the workpiece is bulged outwardly against the plates to form a set of partial convolutions, means for completing said convolutions by compressing the portion of the workpiece enclosed by the forming plates towards the adjacent end of the tube while said pressure is maintained, and means for forming a second set of convolutions including means to release said pressure and means to feed the completed convolutions to said tube to advance an unformed section of the workpiece to the forming plates.

6. Apparatus for forming flexible tubing having, in combination, a tube to receive a portion of a workpiece of tubing, the workpiece having an open end within said tube, the tube having a chuck mounted adjacent the end thereof and adapted to close about the workpiece, the tube further having means to form an annular seal with the outer wall of the workpiece, spaced forming plates adapted for closing around a portion of the workpiece outside the tube and adjacent an end thereof, means for applying hydraulic pressure to the interior of the tube, the tube having clearance about the workpiece to permit said pressure to reach the inner and outer surfaces of the workpiece except for the outer surface between the seal and said forming plates, whereby the workpiece is bulged outwardly against the plates to form a set of partial convolutions, means for completing said convolutions by compressing the portion of the workpiece enclosed by the forming plates towards the adjacent end of the tube while said pressure is maintained, and means for forming a second set of convolutions including means to release said pressure, means to open the chuck, means to feed the completed convolutions into said tube to advance an unformed section of the workpiece to the forming plates, and means to reclose the chuck upon the workpiece.

7. In apparatus for forming flexible tubing, means to seal a workpiece of convoluted tubing having an open end including, in combination, a tubular member to receive said end of the workpiece, an annular elastomeric seal member secured to the wall of the tube member and provided with a flange extending radially inward between the convolutions of the workpiece, said flange being adapted to be deflected over the radially outermost periphery of the convolutions and extending to a line intermediate the radially outermost and innermost diameters thereof, and means to apply fluid pressure to the interiors of the workpiece and said tube, the tube having clearance about the end and the contiguous outer wall of the workpiece to permit said pressure to force said flange firmly against an adjacent convolution.

8. In apparatus for forming flexible tubing, means to seal a workpiece of convoluted tubing having an open end including, in combination, a tubular member to receive said end of the workpiece, an annular elastomeric seal member secured to the wall of the tube member and provided with a flange extending radially inward between the convolutions of the workpiece, means to apply fluid pressure to the interiors of the workpiece and said tube, the tube member having clearance about the workpiece to permit said pressure to force said flange firmly against an adjacent convolution, and means to move the convolutions longitudinally in relation to the tube member, said tube member having clearance about the seal member to permit the seal to withdraw from the space between the convolutions during said movement.

9. Apparatus for forming a flexible tube having, in combination, a pair of hollow members arranged in spaced coaxial relationship, each of said hollow members to receive one end of a workpiece of tubing, the workpiece having annular and axial clearance spaces within each of said hollow members, spaced forming plates adapted for closing around the portion of the workpiece between said hollow members, means for applying hydraulic pressure to the interior of the workpiece, each of said hollow members having a seal for said clearance spaces, one of said seals comprising an annular wall laterally surrounding the tubing and having a relatively small clearance with the workpiece, whereby said pressure causes the workpiece to expand and seal itself against said annular wall and to be bulged outwardly against the plates to form partial convolutions, and means for completing said convolutions by moving said hollow members together while said pressure is maintained.

10. Apparatus for forming a flexible tube having, in combination, a hollow member to receive one end of a workpiece of tubing, the workpiece having annular and axial clearance spaces within said hollow member, said annular clearance space including a sealing portion with a relatively small clearance laterally surrounding the workpiece, spaced forming plates adapted for closing around a portion of the workpiece outside the hollow member and adjacent an end thereof, means for applying hydraulic pressure to the interior of the workpiece, whereby said pressure causes the workpiece to expand and seal itself against said sealing portion and to be bulged outwardly against the plates to form partial convolutions, and means for completing said convolutions by compressing the portion of the workpiece enclosed by the forming plates toward the adjacent end of said hollow member while said pressure is maintained.

References Cited in the file of this patent

UNITED STATES PATENTS

| | | |
|---|---|---|
| 1,689,620 | Clifford | Oct. 30, 1928 |
| 2,048,588 | Babcock | July 21, 1936 |
| 2,306,018 | Frentress | Dec. 22, 1942 |
| 2,372,917 | Tuttle | Apr. 3, 1945 |
| 2,495,059 | Grant | Jan. 17, 1950 |
| 2,581,787 | Dreyer | Jan. 8, 1952 |
| 2,796,109 | Wood | June 18, 1957 |
| 2,797,474 | Main | July 2, 1957 |
| 2,809,853 | Nathan | Oct. 15, 1957 |